United States Patent [19]

Brych

[11] 3,871,915

[45] Mar. 18, 1975

[54] HIGH ENERGY LITHIUM TYPE ELECTROCHEMICAL CELLS

[75] Inventor: Alfred Brych, Chasseneuil Du Poitou, France

[73] Assignee: Saft-Societe Des Accumulateurs Fixes Et De Traction, Ramainville, France

[22] Filed: Oct. 23, 1973

[21] Appl. No.: 408,290

[30] Foreign Application Priority Data
Oct. 30, 1972 France .............................. 72.38412

[52] U.S. Cl. ............ 136/6 LN, 136/100 R, 136/154
[51] Int. Cl. ......................................... H01m 43/06
[58] Field of Search ....... 136/6 LN, 100 R, 154, 20, 136/83 R, 155, 137

[56] References Cited
UNITED STATES PATENTS

| | | | |
|---|---|---|---|
| 3,098,770 | 7/1963 | Horowitz et al. | 136/100 R |
| 3,468,716 | 9/1969 | Eisenberg | 136/100 R |
| 3,567,515 | 3/1971 | Maricle et al. | 136/154 X |
| 3,658,592 | 4/1972 | Dey | 136/83 R X |
| 3,726,716 | 4/1973 | Athearn et al. | 136/100 R |

OTHER PUBLICATIONS

Buhner et al., High Energy System (Organic Electrolyte), Feb. 1967, AD 648,920, prepared for the U.S. Army Material Command, pp. 1,2,3.

Primary Examiner—Anthony Skapars
Attorney, Agent, or Firm—Kenyon & Kenyon Reilly Carr & Chapin

[57] ABSTRACT

The invention comes within the branch of lithium type electric cells. A positive copper oxide or silver chromate electrode and an electrolyte which is a mixture of a solute such as lithium perchlorate and solvent, a non-saturated ester such as vinylene carbonate mixed with a saturated cylic ether such as dioxolane, tetrahydrofuran, propylene oxide also known as methyl oxurane are used. This electrolyte has excellent activity and conductivity for relatively weak concentrations of lithium perchlorate and a very good reaction properties in cold temperatures.

8 Claims, 4 Drawing Figures

HIGH ENERGY LITHIUM TYPE ELECTROCHEMICAL CELLS

RELATED APPLICATIONS

No related applications are copending.

BRIEF SUMMARY OF THE INVENTION

The present invention relates to electrochemical storage cells having a high specific energy whose negative electrode is constituted by an alkaline metal, preferably lithium.

In such electrochemical storage cells, previous research work described in French Pat. Nos. 1,490,726 and 1,570,466 (no corresponding U.S. applications)- have brought to light the very interesting properties of saturated cyclic ethers as solvents of the electrolyte. Among these ethers, tetrahydrofuran more particularly mixed with dimethoxyethane has proved to be a choice solvent. Dioxolane has also shown extremely interesting properties. A great advantage of dioxolane is the capability which this solvent has of dissolving a great quantity of lithium perchlorate. Indeed the solubility of lithium perchlorate therein may range up to four molecules per litre. The electrolyte solutions obtainied have very good conductivity, the maximum conductivity being about $10^{-2} \Omega^{-1} cm^{-1}$. Nevertheless, this maximum conductivity is obtained only for relatively high quantities of lithium perchlorate, e.g. about 3.5M. At low molecular concentrations, for example, 1 M, the conductivity is no more than $5.10^{-3} \Omega^{-1} cm^{-1}$.

Among the other known solvents of electrolytes of lithium type electrochemical storage cells, propylene carbonate is used. Nevertheless, the solubility of lithium perchlorate in propylene carbonate hardly exceeds 1.5 molecules per litre and its conductivity is at its maximum below $6.10^{-3} \Omega^{-1} cm^{-1}$.

It has also been proposed to use as an electrolyte solvent a mixture of tetrahydrofuran and propylene carbonate. Such a mixture gives solutions which have a conductivity greater than that of solutions with pure solvents. Nevertheless, this conductivity varies very greatly as a function of the concentration of the solute, this being liable to cause undesirable polarizations due to the variation in concentration between the cathode and and anode compartments. Thus, the properties under reactions to cold conditions of such solutions does not yield good results.

In this generator according to the invention, use is made of a mixture of solvents enabling the obtention of excellent conductivity for relatively low concentrations of lithium perchlorate and which has very good reaction properties under cold conditions.

The invention has among its objects an electrochemical storage cell whose negative electrode contains, basically, an alkaline metal, preferably lithium, whose positive electrode may be copper oxide or silver chromate containing mixtures and whose electrolyte has as its solvent a mixture of a cyclic ether and ester, characterized in that the ester is a non-saturated cyclic ester.

In an example of a preferred embodiment of the invention, the ester is vinylene carbonate.

The cyclic ether is, to great advantage, tetrahydrofuran or propylene oxide, also known as methyl oxirane. Also, it may be dioxolane.

In a preferred embodiment, the electrolyte solute is constituted by lithium perchlorate. Other known solutes may also be used.

In the preferred embodiments the solvent mixture contains from 50–80 percent by volume of vinylene carbonate, a nonsaturated cyclic ester and from 50–20 percent by volume of a cyclic ether that may be either propylene oxide or dioxolane.

Examples of embodiments will be described in detail herebelow and illustrated by the accompanying drawing in which.

DETAILED DESCRIPTION

Figure 1:
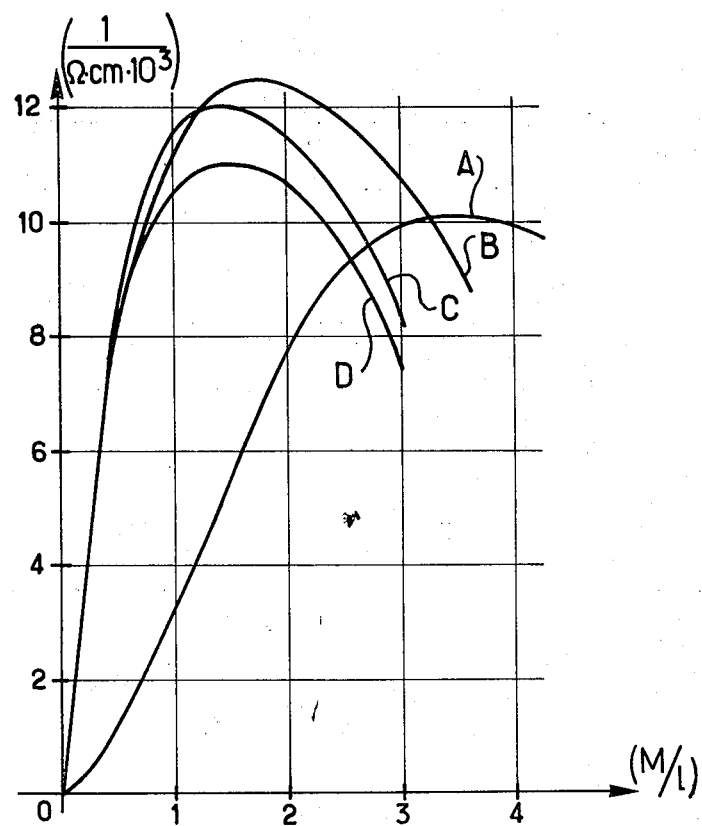
FIG. 1 shows the conductivity curves for electrolytes according to the invention and, in comparison, for electrolytes in which the solvents are used in the pure state.

Firstly, conductivity tests concerning solutions of lithium perchlorate solute whose solvents are constituted respectively by pure dioxolane, pure vinylene carbonate and mixtures, according to the invention, of these two solvents in proportions of 50–50 and 20–80 (20% dioxolane and 80% vinylene carbonate) were used and are shown in FIG. 1. This figure shows the conductivity curves for these four electrolytes as a function of the concentration of lithium perchlorate.

The concentrations of lithium perchlorate in moles per litre are plotted as the abscissae and the conductivity in $10^{-3} \Omega^{-1} cm^{-1}$ is plotted as the ordinates. Curve A represents the conductivity curve of an electrolyte whose solvent is pure dioxolane. Curve D represents the conductivity curve of an electrolyte whose solvent is pure vinylene carbonate. Curves B and C show the conductivity curves for electrolytes according to the invention whose solvents are constituted by mixtures by volume of dioxolane and of vinylene carbonate in the proportions of 50–50 and 20–80 respectively.

As may be seen, the mixture of the solvents bring about a slight increase in the conductivity of the electrolyte.

It enables the obtention of a conductivity as good as that of an electrolyte whose solvent is pure dioxolane for lithium perchlorate concentrations that are much lower than those made with pure dioxolane. On the other hand, the addition of dioxolane to vinylene carbonate enables increase in the range of perchlorate concentrations wherein the conductivity is maintained at a high value. This feature is extremely important for the operation of a cell using such an electrolyte, whose concentration in lithium salts increases during discharges.

A like increase in conductivity is observed for mixtures in which dioxolane is replaced by tetrahydrofuran. In the case of a mixture of 20% tetrahydrofuran and 80% vinylene carbonate by volume, a molar solution of lithium perchlorate yields a conductivity of almost $12.10^{-3} \Omega^{-1} cm^{-1}$. On replacing dioxolane by propylene oxide or methyl oxirane in a 50–50 mixture by volume with vinylane carbonate, the molar solution of lithium perchlorate yields a conductivity of $16.^{-10} \Omega^{-1} cm^{-1}$.

By way of comparison, molar colutions of lithium perchlorate in tetrahydrofuran alone and in propylene oxide alone yield conductivities of $3.10^{-3}$ and $6.10^{-3}$ $\Omega^{-1}$ cm$^{-1}$ respectively.

Specific examples of embodiments of the invention follow:

EXAMPLE 1

A miniature button-type electrochemical cell embodying the invention and having an electrolyte in which the solute is lithium perchlorate and the solvent is constituted by a mixture by volume of 80% vinylene carbonate and 20% propylene carbonate was provided. This miniature sealed button-type cell had a lithium anode and its cathode was constituted by a mixture of silver chromate ($CrO_4Ag_2$), graphite as conductivity diluent and polytetrafluorethylene as binder in the respective proportions by weight of 77, 7.7 and 15.3%. The cathodic mass weighed approximately 0.85 g. This cell was discharged across a 30,000 ohm resistor.

Figure 2:
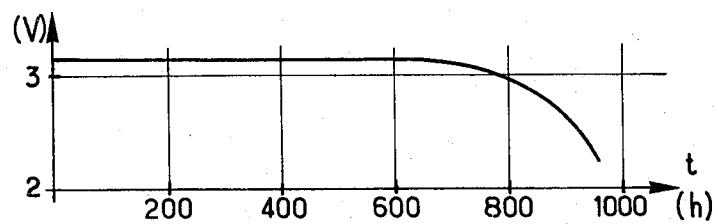
FIG. 2 shows the discharge curve of a cell using an electrolyte according to one embodiment of the present invention.

The resulting discharge curve is shown in FIG. 2, wherein discharge time is plotted as the abscissae and the voltage is plotted as the ordinates. The discharge is stopped when the voltage drops to 2.5 volts, which occurs at about 900 hrs. The cell capacity obtained is about 93 mAh.

EXAMPLE 2

Figure 3:
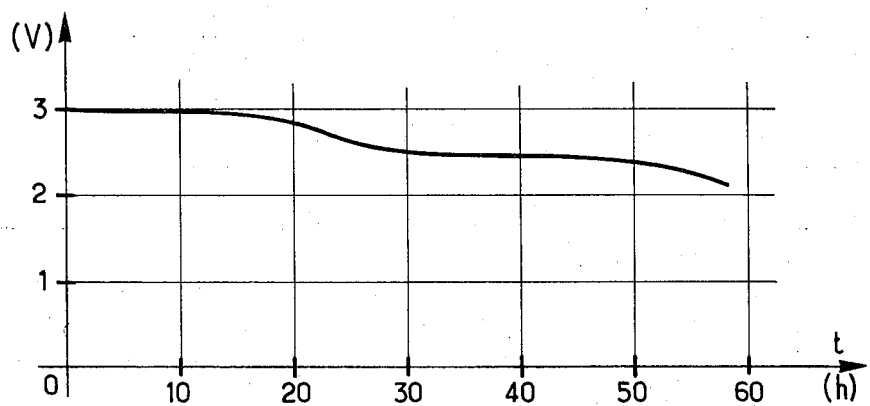
FIG. 3 shows a discharge curve through a 300 jΩ resistor of a cell using another electrolyte embodying the invention.

A second cell of similar type to that of the cell of Example 1 but with a different electrolyte solvent was provided. The electrolyte whose solvent was constituted by a mixture of 80% vinylene carbonate and 20% of dioxalane by volume in this second miniature button-type cell in which the cathode was identical to that in Example 1 and the anode was of lithium. FIG. 3 with coordinates like those of FIG. 1 shows the discharge curve for this second cell discharged through a 300$\Omega$ resistor. The capacity of this second cell is about 500 mAh, at the time its voltage has dropped to 2.5 volts.

EXAMPLE 3

Figure 4:
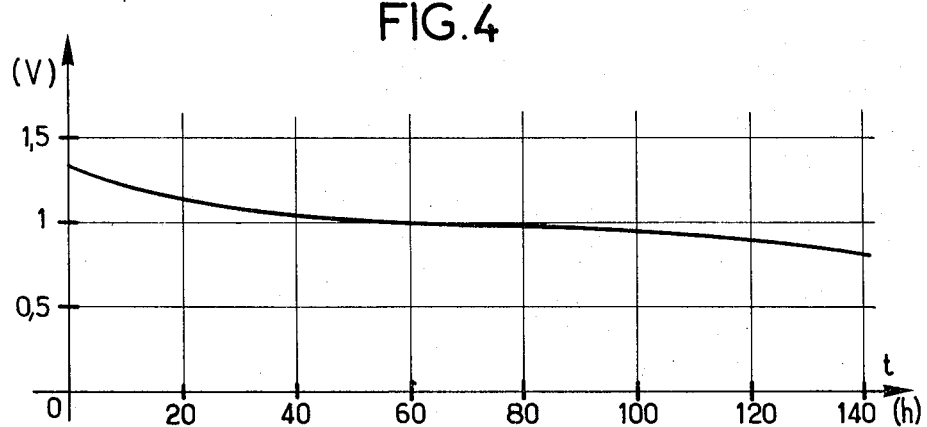
FIG. 4 shows a discharge curve through a 100 Ω resistor of a cell using still another electrolyte embodying the invention.

A third cell of similar type to that of the cell of Example 2 and in which the electrolyte and the anode are identical to those of Example 2 was provided. In this third cell, however, the cathode was constituted by copper oxide. The curve shown in FIG. 4 with the same coordinates as those of FIGS. 2 and 3 shows the rate of discharge of the third cell through a 100$\Omega$ resistor. On stopping the discharge when the voltage drops to 0.9 volts, about 130 hours, indicates that a discharge capacity of about 1.3 Ah is obtained.

While specific embodiments of the invention have been described, variations within the scope of the appended claims are possible and are contemplated. There is no intention, therefore, of limitation to the exact details herein presented.

What is claimed is:

1. An electrochemical cell comprising a positive electrode containing a metal compound selected from the group consisting of a metallic chromate and a metallic oxide a negative electrode containing basically lithium and an electrolyte containing lithium perchlorate as solute and a solvent therefor, said solvent consisting of a mixture of a cyclic ether selected from the group consisting of tetrahydrofuran, dioxolane and propylene oxide and a non-saturated cyclic ester vinylene carbonate.

2. An electrochemical cell according to claim 1, wherein said mixture contains from 50–80 percent of said non-saturated cyclic ester from 50–20 percent of said cyclic ether.

3. An electrochemical cell according to claim 1 wherein said metallic chromate is silver chromate and said metallic oxide is copper oxide.

4. An electrochemical cell according to claim 1 wherein said positive electrode comprises a mixture of silver chromate, conductivity diluent and a binder.

5. An electrochemical cell according to claim 4, wherein said conductivity diluent is graphite and said binder is polytetrafluorethylene, said mixture comprising by weight about 77.7% silver chromate, about 7.7% graphite and about 15.3% polytetrafluorethylene.

6. An electrolyte for a lithium base electrochemical cell having a positive electrode containing a metal compound selected from the group consisting of silver chromate and copper oxide, said electrolyte consisting of a solution consisting of lithium perchlorate as solute and a solvent consisting of a misture of a cyclic ether selected from the group consisting of tetrahydrofuran, dioxolane and propylene oxide and vinylene carbonate, a non-saturated cyclic ester.

7. An electrolyte according to claim 6 wherein said cyclic ether and said non-saturated cyclic ester in said mixture are present in the proportions by volume respectively of 50–80 percent of said ester and 50–20 percent of said ether.

8. An electrolyte according to claim 6 constituting a molar solution of said solute in said solvent.

* * * * *